Figure 1:
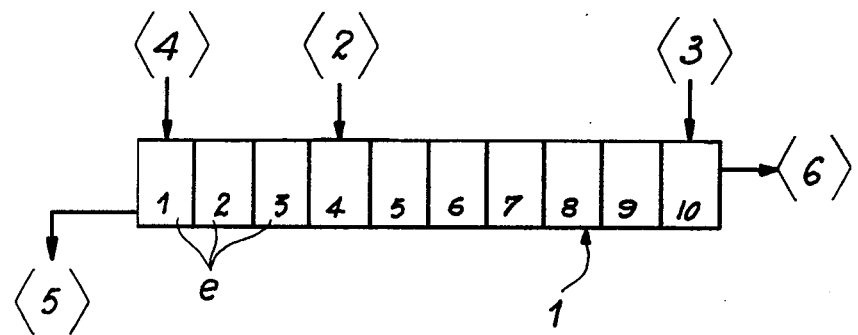

United States Patent [19]

Cousinou et al.

[11] 3,980,750

[45] Sept. 14, 1976

[54] METHOD OF SELECTIVE STRIPPING OF PLUTONIUM FROM AN ORGANIC SOLVENT CONTAINING PLUTONIUM AND IN SOME CASES URANIUM BY REDUCTION OF SAID PLUTONIUM

[75] Inventors: Gérard Cousinou, Manosque; Michel Ganivet, Aix-en-Provence, both of France

[73] Assignee: Commissariat a l'Energie Atomique, Paris, France

[22] Filed: Dec. 21, 1973

[21] Appl. No.: 427,352

[30] Foreign Application Priority Data
Dec. 28, 1972 France .............................. 72.46656

[52] U.S. Cl. ....................................... 423/9; 423/8; 423/10; 252/301.1 R
[51] Int. Cl.² ....................................... B01D 11/00
[58] Field of Search .......................... 423/8, 9, 10; 252/301.1 R

[56] References Cited
UNITED STATES PATENTS
3,343,925   9/1967   Bathellier .............................. 423/10
3,346,345   10/1967   Schulz ................................... 423/9

Primary Examiner—Stephen J. Lechert, Jr.
Attorney, Agent, or Firm—Lane, Aitken, Dunner & Ziems

[57] ABSTRACT

The method of selective stripping from plutonium-loaded organic solvents which may also contain uranium consists in bringing the initial organic solvent into countercurrent contact with a solution containing a reducing agent consisting of an aromatic organic compound selected from the group comprising the substituted hydrazines, the polyamines, the aminophenols, and an agent for the removal of the nitrites which are formed.

One field in which the method finds an application is the extraction of uranium and plutonium from nitric acid solutions derived from the reprocessing of irradiated nuclear fuels.

14 Claims, 2 Drawing Figures

METHOD OF SELECTIVE STRIPPING OF PLUTONIUM FROM AN ORGANIC SOLVENT CONTAINING PLUTONIUM AND IN SOME CASES URANIUM BY REDUCTION OF SAID PLUTONIUM

This invention relates to a method of selective stripping of plutonium from organic solvents containing plutonium and in some cases uranium by reduction of said plutonium. The method according to the invention applies either to organic solvents loaded with plutonium and uranium such as tributylphosphate or to organic solvents loaded only with plutonium such as trilaurylamine.

One of the best-known methods for extracting uranium and plutonium from nitric acid solutions derived from the reprocessing of irradiated fuels consists in employing tributylphosphate which is diluted in an inert hydrocarbon such as kerosene or dodecane. The nitrates of uranyl and plutonium-IV form complexes with this complexing agent.

The plutonium contained in the tributylphosphate which is thus loaded is then subjected to a stripping and reducing operation either by means of iron-II in a sulphamic nitric acid medium or by means of uranium-IV in the presence of hydrazine. Stripping of uranium-VI is then carried out in a highly dilute nitric acid medium ($10^{-2}M$ $HNO_3$) in order to destroy the complexes of uranyl nitrate.

The methods mentioned in the foregoing suffer from a number of disadvantages. In fact, in the case of reduction of Pu(IV) to Pu(III) by iron(II) in a sulphamic nitric acid medium, there is found to be present iron-(III) which is mixed with the plutonium and contaminates this latter. In the case of reduction by uranium-IV, the main stumbling-block is the high cost of preparation of said uranium-IV and the disadvantage involved in introducing a large additional quantity of uranium. Moreover, in the case of enriched uranium, the problem which arises is the preparation of uranium-IV which has the same isotopic composition as the uranium of the starting fuel.

Another method of extraction of plutonium from nitric acid solutions derived from the reprocessing of irradiated fuels consists in complexing the plutonium with trilaurylamine. Stripping of plutonium from the trilaurylamine which is thus loaded is carried out, for example, by complexing with sulphuric acid. This method has a disadvantage in that it employs $SO_4^{--}$ ions which are troublesome from the point of view of corrosion of installations and from the point of view of final purity of the plutonium oxide which is obtained.

The method according to the invention overcomes the disadvantages recalled in the foregoing, especially insofar as it permits the possibility of obtaining rapid and total reduction of Pu(IV) to Pu(III) while making use of reducing agents such that the oxidation products formed or the reducing agent in excess do not leave any fixed residues.

The method according to the invention is primarily characterized in that the initial loaded organic solvent is contacted in countercurrent flow with a solution containing a reducing agent constituted by an aromatic organic compound selected from the group comprising the substituted hydrazines, the polyamines, the aminophenols, and an agent whose intended function is to remove the nitrites which are formed.

In accordance with an advantageous feature of the method according to the invention, the solution containing the reducing agent and the agent for removing the nitrites is an aqueous nitric-acid solution.

Without any limitation being intended, aromatic organic reducing agents which can be mentioned as being of particular interest are phenylhydrazine, paraphenylene-diamine, para-aminophenol, diamino-2,4-phenol. Suitable agents which are open to selection for the removal of nitrites are hydrazine, phenylhydrazine, sulphamic acid as employed either alone or in a mixture.

In accordance with a characteristic feature of the invention, the aromatic organic compound which constitutes the reducing agent can also perform the function of agent for the removal of nitrites. To this end, phenylhydrazine is particularly advantageous since this latter is on the one hand an energy reductant and on the other hand an agent for removing nitrites.

The method according to the invention can be employed in any device for contacting two phases in countercurrent flow, for example in banks of mixer-settlers of known type such as those described in U.S. Pat. No. 3,692,494 and British Patent No. 1,268,332 in the name of the present Applicant.

A better understanding of the invention will be gained from the following description of one mode of execution of the method according to the invention. Reference is made in this description to the accompanying FIG. 1 which shows diagrammatically the bank of mixer-settlers in which the method is carried out. It should clearly be understood that this description does not set any limitation on the scope of the invention.

Stripping of the plutonium is carried out in the bank of mixer-settlers which are designated in FIG. 1 by the reference 1. This bank is made up of 10 stages bearing the references $e_1$ to $e_{10}$.

The tributylphosphate loaded with uranium and plutonium is introduced at 2 into the stage $e_4$ of the bank 1. The aqueous nitric acid solution contains the aromatic organic compound and the agent which permits removal of the nitrites formed is introduced at 3 into stage $e_{10}$. A wash solvent is introduced into the stage $e_1$ of the bank 1 at 4.

There is obtained at 5 an aqueous nitric acid solution containing the stripped plutonium in the valence state III. The tributylphosphate which is loaded with uranium alone is recovered at 6 at the outlet of the bank of mixer-settlers 1.

Figure 2:
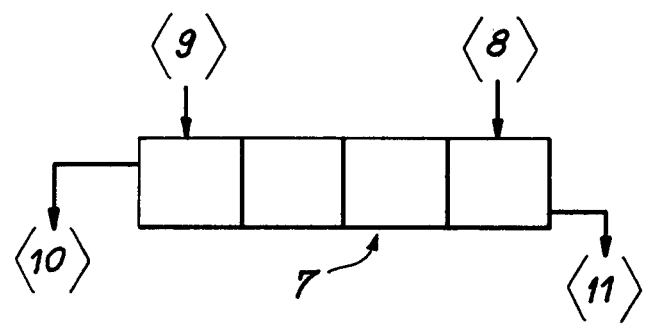

Regeneration of the organic solvent after the uranium has been removed from this latter is carried out as follows: said regeneration operation is performed in a bank of mixer-settlers as designated by the reference 7 in the accompanying FIG. 2 by contacting the organic solvent to be regenerated with a solution of 1M $Na_2CO_3$/1M NaOH. The solvent to be regenerated is introduced at 8 and the alkaline solution is introduced at 9. There is recovered at 10 the regenerated solvent and at 11 an alkaline solution containing the aromatic organic reducing agent in excess and the product obtained as a result of oxidation of said aromatic organic reducing agent.

Six examples of application of the method according to the invention are given hereinafter without any implied limitation.

Examples 1 to 5 relate to stripping of plutonium from an organic solvent consisting of tributylphosphate diluted in dodecane which is loaded with uranium and plutonium. Example 6 relates to the case in which plutonium is stripped from a solvent consisting of trilaurylamine diluted in dodecane.

EXAMPLE 1

The initial tributylphosphate loaded with uranium and plutonium is derived from an extraction unit (not shown in the figure) in which an initial aqueous phase having the following composition:

0.5M U
0.1M Pu
1.8M to 7M $HNO_3$ is contacted with tributylphosphate diluted in dodecane.

The tributylphosphate which is thus loaded is introduced into the stripping bank 1 at 2, at a flow rate of 4 l/hr.

A reducing solution having the following composition 0.04M phenylhydrazine
0.05M hydrazine
1.5M $HNO_3$ is introduced into the bank 1 at 3, at a flow rate of 3.3 l/hr, which corresponds to a molar ratio of phenylhydrazine/plutonium which is equal to ⅓.

A tributylphosphate wash solvent is introduced at 4.

A 0.1M aqueous nitric acid solution of Pu(III) is obtained at 5 and the uranium-loaded tributylphosphate is recovered at 6.

EXAMPLE 2

The initial tributylphosphate loaded with uranium and plutonium is the same as that described in Example 1.

A reducing solution having the following composition:

0.6M phenylhydrazine
1.5M $HNO_3$ is introduced into the bank 1 at 3 at a flow rate such as to have a molar ratio of phenylhydrazine/plutonium which is equal to ½.

In this case, the phenylhydrazine performs both the function of reductant and agent for removal of nitrites.

The subsequent procedure is then exactly as described in Example 1.

EXAMPLE 3

The initial tributylphosphate loaded with uranium and plutonium is the same as the tributylphosphate described in Example 1.

A reducing solution having the following composition:

0.1M paraphenylene-diamine
0.05M hydrazine
1.5M $HNO_3$ is introduced into the bank 1 at 3, at a flow rate such as to have a molar ratio of paraphenylene-diamine/plutonium which is equal to 1.

The operation is then performed as in Example 1.

EXAMPLE 4

The initial tributylphosphate loaded with uranium and plutonium is the same as that described in Example 1.

A reducing solution having the following composition:

0.1M para-aminophenol
0.05M hydrazine
1.5M $HNO_3$ is introduced into the bank 1 at 3, at a flow rate such as to have a molar ratio of para-aminophenol/plutonium which is equal to 1.

The operation is then performed as in Example 1.

EXAMPLE 5

The initial tributylphosphate loaded with uranium and plutonium is the same as that described in Example 1.

A reducing solution having the following composition:

0.1M diamino-2,4-phenol
0.05M hydrazine
1.5M $HNO_3$ is introduced into the bank 1 at 3, at a flow rate such as to have a molar ratio of diamino-2,4-phenol/plutonium which is equal to 1.

The operation is then performed as in Example 1.

EXAMPLE 6

It is endeavored to strip the plutonium contained in the form of nitrate in the valence state IV from trilaurylamine diluted in dodecane. The stripping solution employed consists of a solution having the following composition:

0.05M hydrazine
0.04M phenylhydrazine
0.5M nitric acid

By making use of a particularly advantageous reducing agent, the method according to the invention thus makes it possible to accomplish efficient stripping of the plutonium contained both in the tributylphosphate and in the trilaurylamine. By virtue of the method considered, it is possible to strip approximately 99.9% of the plutonium contained in the initial organic solvent.

What we claim is:

1. A method of selective stripping of plutonium from an organic solvent containing plutonium comprising countercurrently contacting said organic solvent with a solution containing a reducing agent for plutonium, said reducing agent being an aromatic organic compound selected from the group consisting of substituted hydrazines, polyamines and aminophenols and an agent for removing the nitrites which are formed.

2. A method according to claim 1, wherein the solution containing the aromatic organic compound and the agent for removing the nitrites is an aqueous nitric-acid solution.

3. A method according to claim 1, wherein the aromatic organic compound is also the agent for removing nitrites.

4. A method according to claim 1, wherein the aromatic organic compound is phenylhydrazine.

5. A method according to claim 1, wherein the aromatic organic compound is paraphenylene-diamine.

6. A method according to claim 1, wherein the aromatic organic compound is para-aminophenol.

7. A method according to claim 1, wherein the aromatic organic compound is diamino-2,4-phenol.

8. A method according to claim 1, wherein the agent for removing the nitrites is selected from the group consisting of hydrazine, phenylhydrazine, sulphamic acid and mixtures thereof.

9. The method according to claim 1 wherein said organic solvent is tributylphosphate diluted in dodecane.

10. The method according to claim 1 wherein said organic solvent is trilaurylamine.

11. The method according to claim 1 wherein said organic solvent contains plutonium and uranium.

12. A method of selective stripping of plutonium from an organic solvent containing plutonium comprising contacting said organic solvent with a nitric acid stripping solution containing a reducing agent for plutonium, said reducing agent being an aromatic organic compound selected from the group consisting of phenylhydrazine, paraphenylene-diamine, para-aminophenol and diamino-2,4-phenol and an agent for removing nitrites selected from the group consisting of hydrazine, phenylhydrazine, sulphamic acid and mixtures thereof.

13. A method according to claim 12 wherein said organic solvent is trilaurylamine.

14. A method according to claim 12 wherein said organic solvent is tributylphosphate diluted in dodecane and contains plutonium and uranium.

* * * * *